(12) United States Patent
Chiang

(10) Patent No.: US 7,821,800 B2
(45) Date of Patent: Oct. 26, 2010

(54) POWER ADAPTER FOR PROVIDING OUTPUT POWER LIMITING AND LOAD-DEPENDENT VOLTAGE REGULATION

(75) Inventor: Chin-Tsai Chiang, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 355 days.

(21) Appl. No.: 11/773,041

(22) Filed: Jul. 3, 2007

(65) Prior Publication Data

US 2008/0123378 A1    May 29, 2008

(30) Foreign Application Priority Data

Jul. 5, 2006    (TW) ................ 95124533 A

(51) Int. Cl.
*H02H 7/122* (2006.01)

(52) U.S. Cl. ............... 363/56.1; 363/21.09; 363/80; 320/140

(58) Field of Classification Search ............ 323/285; 363/21.07, 21.09, 56.1, 56.11, 80; 320/140
See application file for complete search history.

(56) References Cited

U.S. PATENT DOCUMENTS

| 5,408,401 | A   | * | 4/1995  | Miyazaki      | 363/21.08 |
| 6,137,267 | A   | * | 10/2000 | Kates et al.  | 320/136   |
| 6,492,845 | B1  | * | 12/2002 | Ge et al.     | 327/53    |
| 7,012,408 | B2  | * | 3/2006  | Chen          | 320/152   |
| 7,046,524 | B2  | * | 5/2006  | Hoffman et al.| 363/21.09 |
| 2005/0041446 | A1 | * | 2/2005 | Harnett et al.| 363/95    |

* cited by examiner

Primary Examiner—Jeffrey L Sterrett
Assistant Examiner—Fred E Finch, III

(57) ABSTRACT

Disclosed is a power adapter having a voltage limiting circuit for limiting an output voltage of the power adapter at a predetermined voltage level when an output current of the power adapter is smaller than a threshold current, and a power limiting circuit for limiting an output power of the power adapter at a predetermined power level when an output current of the power adapter reaches the threshold current, in which the voltage limiting circuit can be configured to receive a current control signal from a load and in response thereto issue a load current regulation signal to a switching control circuit of the power adapter, thereby regulating the output voltage of the power adapter based on the load current regulation signal.

19 Claims, 4 Drawing Sheets

POWER ADAPTER FOR PROVIDING OUTPUT POWER LIMITING AND LOAD-DEPENDENT VOLTAGE REGULATION

FIELD OF THE INVENTION

The present invention is related to a power adapter, and more particularly to a power adapter capable of providing output power limiting and load-dependent voltage regulation.

BACKGROUND OF THE INVENTION

FIG. 1 is a systematic view showing a power supply system for a portable computer according to the prior art. As shown in FIG. 1, a power adapter 100 is configured to convert an input AC voltage into an output DC voltage, in which the output DC voltage is used to power a portable computer 102. The portable computer 102 includes a battery pack 104 and a DC-DC converter 106, in which the DC-DC converter 106 is configured to convert the DC voltage provided by the power adapter 100 into a DC voltage required by the internal components of the portable computer 102. The battery pack 104 is configured to power the portable computer 102 in case that the portable computer 102 is not powered by the power adapter 100. Generally, the battery pack 104 can be constituted by a plurality of serially-connected rechargeable batteries. The battery pack 104 is configured to store a portion of the output energy of the power adapter 100 through a battery charger 108 when the portable computer 102 is powered by the power adapter 100 and release the stored energy to the DC-DC converter 106 through voltage rails 109 when the portable computer 102 is not powered by the power adapter 100, thereby enabling the DC-DC converter 106 to provide the voltage required by the internal components of the portable computer 102. The battery charger 108 is configured to downscale the DC voltage provided by the power adapter 100 into a DC voltage which is tailored to charge the battery pack 104, thereby charging the battery pack 104.

FIG. 2 is a circuit block diagram showing the circuit architecture of the power adapter 100 of FIG. 1. As shown in FIG. 2, the power adapter 100 includes a power converter stage 110 which includes a bridge rectifier 121, a switch 122, a switch controller 123, a transformer 124, and a rectifier/filter circuit 125. The bridge rectifier 121 is configured to receive an input AC voltage Vin and convert the input AC voltage Vin into a full-wave rectified DC voltage. The transformer 124 has a primary winding Np and a secondary winding Ns, in which the primary winding Np is connected in series with the switch 122 and configured to store the energy received from the input AC voltage Vin when the switch 122 is ON and transfer the stored energy to the secondary winding Ns when the switch 122 is OFF. The rectifier/filter circuit 125 is constituted by a rectifying diode Dr11 and a filtering capacitor Cf11, and configured to perform rectification and filtration to the energy received by the secondary winding Ns so as to generate a desired output DC voltage Vo. Besides, the power adapter 100 further includes a voltage-limiting circuit 126 and a current-limiting circuit 127. The voltage-limiting circuit 126 includes a voltage divider which is consisted of resistors R11 and R12 and connected to an output terminal of the power converter stage 110. The voltage divider (R11, R12) is configured to generate a fractional output voltage. The voltage-limiting circuit 126 further includes a voltage-limiting amplifier 132 which compares the fractional output voltage provided by the voltage divider (R11, R12) with a first reference voltage Vref11 and in response thereto generates an error control signal. The error control signal is sent to the switch controller 123 through a photo coupler 128 so that the switch controller 123 can regulate the switching duty cycle of the switch 122 according to the error control signal, thereby limiting the output voltage Vo of the power converter stage 110 at a predetermined level. The current-limiting circuit 127 includes a current-sensing resistor Rs11 which is located on the current return path of the power converter stage 110 and configured to generate a sensed voltage being proportional to the output current of the power converter stage 110 when the output current of the power converter stage 110 flows through the current-sensing resistor Rs11. The sensed voltage is coupled to an inverting input terminal of a transconductance amplifier 133, and the non-inverting input terminal of the transconductance amplifier 133 is coupled to a second reference voltage Vref12. The second reference voltage Vref12 is generated by a voltage divider (R13, R14) which is connected to the first reference voltage Vref11, in which the second reference voltage Vref12 is proportional to a maximum current. The transconductance amplifier 133 compares the sensed voltage provided by the current-sensing resistor Rs11 and the second reference voltage Vref12 to determine if the output current of the power converter stage 110 reaches the maximum current. If it is determined that the output current of the power converter stage 110 reaches the maximum current, the transconductance amplifier 133 issues an over-current detection signal. The over-current detection signal is sent to the switch controller 123 through the photo coupler 128 so that the switch controller 123 can limit the output current of the power converter stage 110 at the maximum current to prevent the over-current problems.

The conventional power adapter 100 for portable computer is generally a constant voltage adapter. Because the output voltage of the power adapter 100 is stationary, the output current of the power adapter 100 can determine the output power. According to the constant voltage characteristic of the power adapter 100, the output current of the power adapter 100 will continue rising as the output voltage of the power adapter 100 is stationary. The rising of the output current of the power adapter 100 implies the increase of the output power of the power adapter 100. If the output current of the power adapter 100 exceeds the maximum current, overpower problems would occur. Under this condition, the power adapter 100 is prone to undergo over-heating problems and the lifetime of the power adapter 100 will be shortened accordingly.

In addition, when the power adapter 100 is supplying power to the portable computer 102 through the DC-DC converter 106, the power adapter 100 will charge the battery pack 104 through the battery charger 108 as well. When the battery pack 104 retains a certain amount of electric energy, the battery pack 104 can be charged with a smaller charging current. The decrease of the charging current for the battery pack 104 implies the decrease of the load current provided by the power adapter 100 to the battery pack 104. However, the output voltage of the power adapter 100 is always stationary as stated above. Under this condition, a considerable power loss will be produced on the battery charger 108 and the DC-DC converter 106, and thus the conversion efficiency of the battery charger 108 and the DC-DC converter 106 is reduced.

Hence, if the output voltage of the power adapter 100 can be regulated in response to the load's requirements for load current regulation and the output power of the power adapter 100 can be limited when the output current of the power adapter 100 reaches a threshold current, the over-heating problems of the power adapter 100 can be addressed and the conversion efficiency of the battery charger 108 and the DC- DC converter 106 can be enhanced. Also, the power loss caused by the battery charger 108 and the DC-DC converter 106 can be reduced.

There is a tendency to develop a power adapter capable of providing the function of output power limiting for limiting the output power of the power adapter at a predetermined level when the output current of the power adapter reaches a threshold current and regulating the output voltage in response to the current control signal sent from the load side.

SUMMARY OF THE INVENTION

An object of the present invention is to provide a power adapter for limiting the output power of the power adapter at a predetermined level when the output current of the power adapter reaches a threshold current.

Another object of the present invention is to provide a power adapter for receiving a current control signal from the load side and in response thereto regulating the output voltage of the power adapter.

According to the preferred embodiment of the present invention, a power adapter is provided and includes a power converter stage having a switch controller for converting an input power, such as an AC voltage into an output power, such as a DC voltage, and powering a load. The power adapter further includes a voltage-limiting circuit connected to an output terminal of the power converter stage for limiting the output voltage of the power converter stage at a predetermined level through the switch controller when the output current of the power converter stage is smaller than a threshold current, and a power-limiting circuit connected to an output terminal of the power converter stage for limiting the output power of the power converter stage at a predetermined level through the switch controller when the output current of the power converter stage reaches the threshold current.

Also, the voltage-limiting circuit is configured to receive a current control signal from the load and in response thereto issue a load current regulation signal to the switch controller to regulate the output voltage of the power converter stage through the switch controller.

Also, the power adapter can optionally include a current-limiting circuit connected to an output terminal of the power converter stage for limiting the output current of the power converter stage through the switch controller when the output current of the power converter stage reaches a maximum current.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 3:
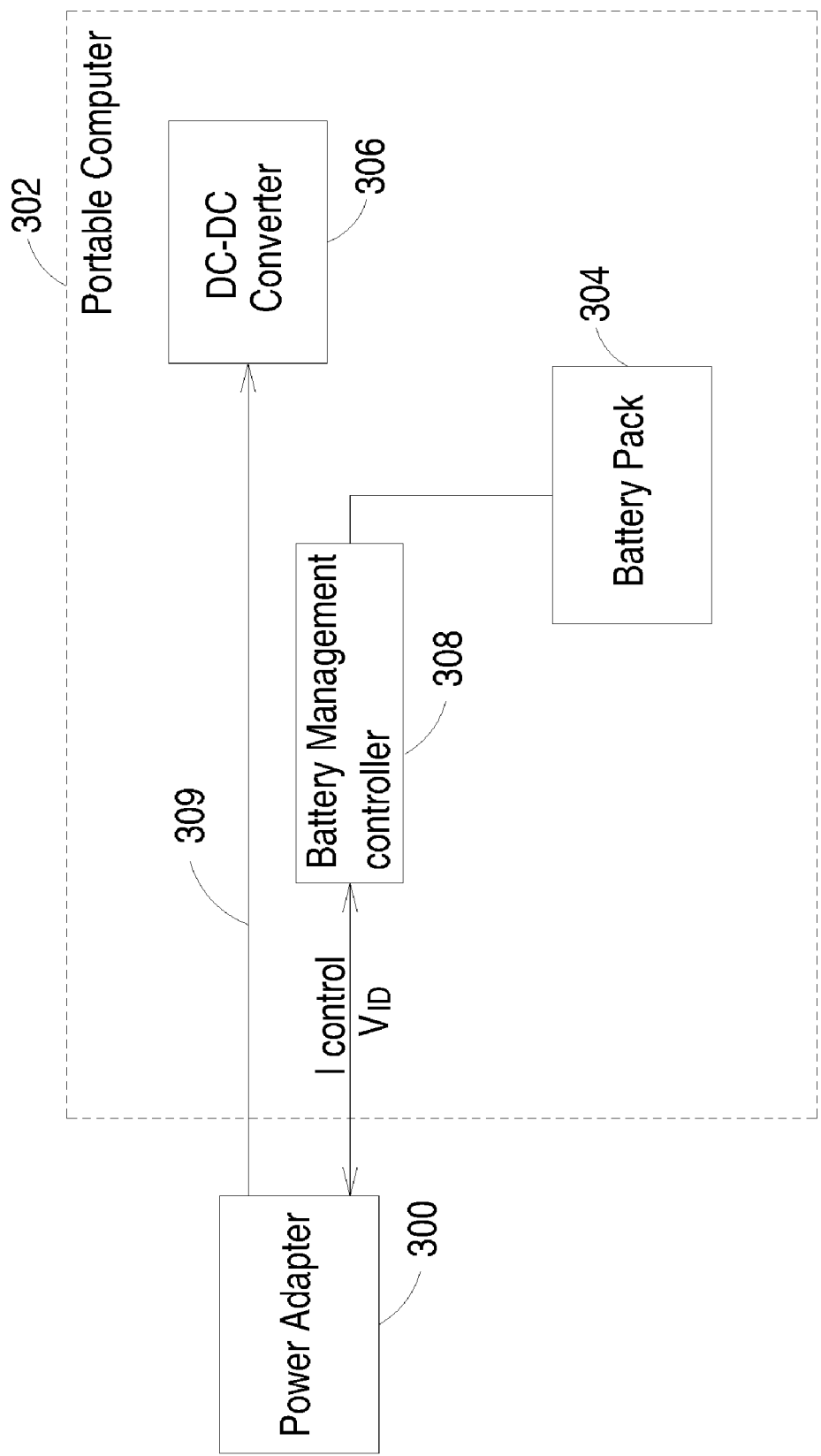
FIG. 3 is a diagrammatic view showing the power supply system for a portable computer according to a preferred embodiment of the present invention.

A preferred embodiment of the present invention is illustrated in FIG. 3. As shown in FIG. 3, a power adapter 300 is configured to convert an input AC voltage into an output DC voltage, in which the output DC voltage is used to power a portable computer 302. The portable computer 302 includes a battery pack 304 and a DC-DC converter 306, in which the DC-DC converter 306 is configured to convert the DC voltage provided by the power adapter 300 into the voltage required by the internal components of the portable computer 302. The battery pack 304 is configured to provide power to operate the portable computer 302 when the portable computer 302 is not powered by the power adapter 300. Generally, the battery pack 304 can be constituted by a plurality of serially-connected rechargeable batteries. The battery pack 304 is configured to store a portion of the output energy of the power adapter 300 when the portable computer 302 is powered by the power adapter 300 and transfer the stored energy to the DC-DC converter 306 through voltage rails 309 when the portable computer 302 is not powered by the power adapter 300, so that the DC-DC converter 306 can provide the voltage required by the internal components of the portable computer 302. A battery management controller 308 is mounted within the portable computer 302 and configured to monitor the information of the battery pack 304, including the battery temperature, the battery voltage, the remaining capacity, the charging time, the charging voltage and the charging current, and provide over-current protection, over-voltage protection and under-voltage protection to the battery pack 304, so as to control the charging operation of the battery pack 304 and protect the battery pack 304.

Figure 4:
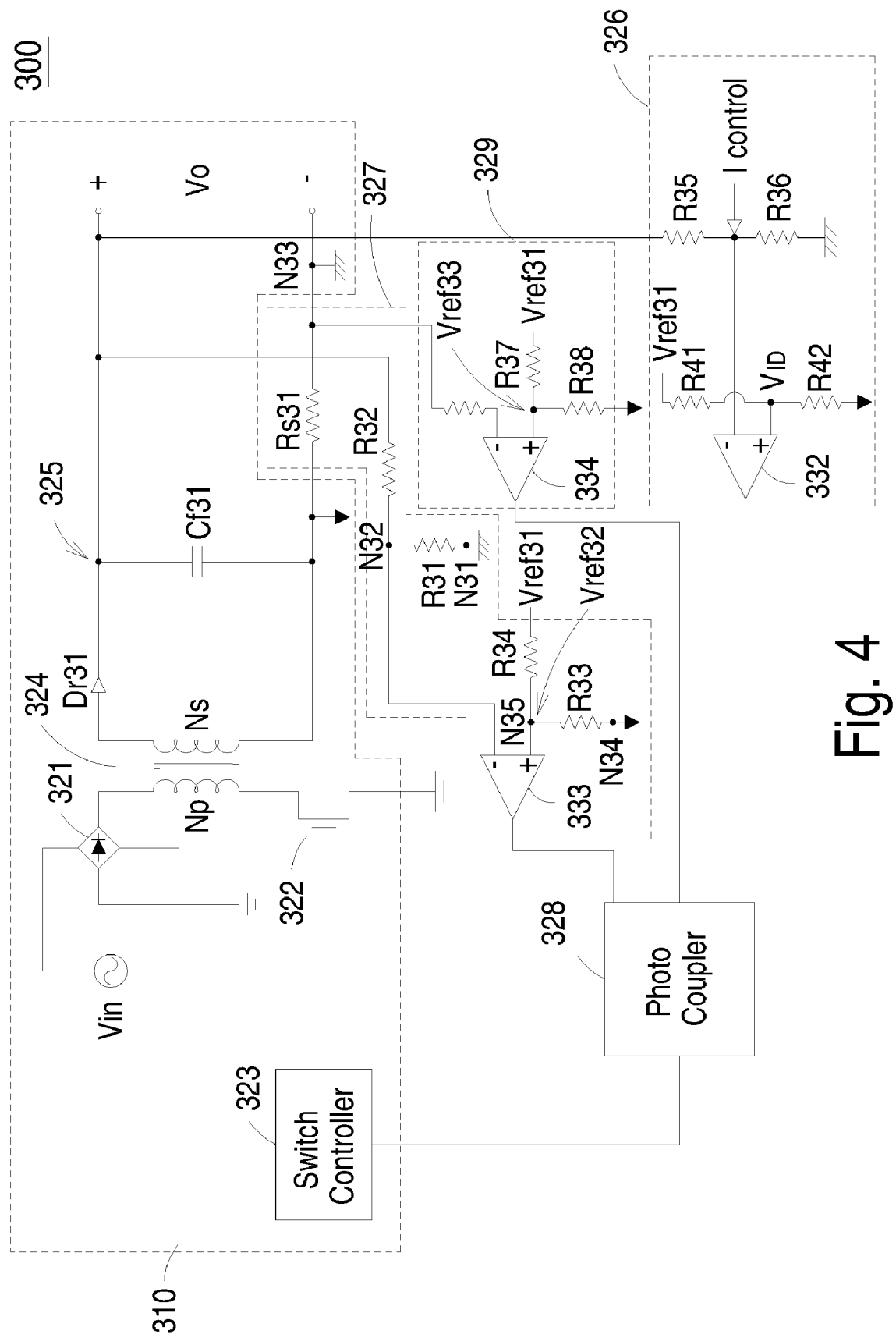
FIG. 4 is a circuit block diagram of the power adapter of FIG. 3.

FIG. 4 is a circuit diagram showing the circuit architecture of the power adapter 300 of FIG. 3. As shown in FIG. 4, the power adapter 300 includes a power converter stage 310 having a bridge rectifier 321, a switch 322, a switch controller 323, a transformer 324, and a rectifier/filter circuit 325. The bridge rectifier 321 is configured to receive an input AC voltage Vin and convert the input AC voltage into a full-wave rectified DC voltage. The transformer 324 has a primary winding Np and a secondary winding Ns, in which the primary winding Np is connected in series with the switch 322 and configured to store energy from the input AC voltage Vin when the switch 322 is ON and transfer the stored energy to the secondary winding Ns when the switch 322 is OFF. The rectifier/filter circuit 325 is made up of a rectifying diode Dr31 and a filtering capacitor Cf31 and configured to perform rectification and filtration to the energy received by the secondary winding Ns so as to generate a desired voltage Vo. It is to be noted that the power adapter 300 shown in FIG. 4 is configured with a flyback topology. However, the inventive power adapter can be configured with other power converter topologies, including but not limited to, a forward topology and an asymmetrical half-bridge topology. Besides, the power adapter 300 further includes a voltage-limiting circuit 326 and a power-limiting circuit 327. The voltage-limiting circuit 326 is connected to an output terminal of the power converter stage 310 and includes a voltage divider which is consisted of resistors R35 and R36 for generating a fractional output voltage. The voltage-limiting circuit 326 also includes a voltage divider which is consisted of resistors R41 and R42 and connected to a first reference voltage Vref31. The voltage divider (R41, R42) is configured to generate a fractional first reference voltage $V_{ID}$. The voltage-limiting circuit 326 further includes a voltage-limiting amplifier 332 for comparing the fractional output voltage provided by the voltage divider (R35, R36) with the fractional first reference voltage $V_{ID}$ provided by the voltage divider (R41, R42) and generating an error control signal based on the results of comparison. The error control signal is sent to the switch controller 323 through a photo coupler 328, so that the switch controller 323 can regulate the switching duty cycle of the switch 322 based on the error control signal and thereby limiting the output voltage Vo of the power converter stage 310 at a predetermined level.

The power-limiting circuit 327 is connected to an output terminal of the power converter stage 310 and includes a current-sensing resistor Rs31, resistors R31, R32, R33, R34, and a power-limiting amplifier 333. The resistor R31 is connected between the node N31 and the node N32, and the resistor R32 is connected between the positive voltage output terminal and the node N32. Because the node N31 is connected to the same ground reference with the node N33 which is located on the current return path of the power converter stage 310, the voltage of the node N31 can be taken as the same with the voltage of the node N33, thereby producing a current signal at the node N32 by the voltage drop across the current-sensing resistor Rs31 plus a small positive bias voltage. The current signal of the node N32 indicates the output current of the power converter stage 310 and is coupled to the inverting input terminal of the power-limiting amplifier 333. In addition, a second reference voltage Vref32 is coupled to the non-inverting input terminal of the power-limiting amplifier 333. The second reference voltage Vref32 is generated by the voltage divider (R33, R34) which is connected to the first reference voltage Vref31 and is proportional to a threshold current. Therefore, a signal indicative of current will be generated at the node N35 by the second reference voltage Vref32. The power-limiting amplifier 333 compares the signal indicative of the output current of the power converter stage 310 with the signal indicative of the threshold current to determine if the output current of the power converter stage 310 reaches the threshold current. If it is determined that the output current of the power converter stage 310 reaches the threshold current, the power-limiting amplifier 333 issues a power-limiting signal to the switch controller 323 through the photo coupler 328, thereby limiting the product of the output voltage of the power converter stage 310 and the output current of the power converter stage 310 at a predetermined level. Therefore, if the output current of the power converter stage 310 reaches the threshold current, the power-limiting circuit 327 can drive the switch controller 323 to limit the output power of the power converter stage 310 at a predetermined level to prevent the over-power problems.

Also, the battery management controller 308 is connected to the battery pack 304 for monitoring the battery temperature, the battery voltage, the remaining capacity, the charging time, and the charging current of the battery pack 304 and providing a protection mechanism to the battery pack 304, as shown in FIG. 3. Also, the battery management controller 308 can be set to issue a control signal Icontrol to the power adapter 300 according to the measured battery voltage. The current control signal Icontrol is a current signal that is coupled to the inverting input terminal of the voltage-limiting amplifier 332 located within the voltage-limiting circuit 326, as shown in FIG. 4. In this way, the output of the voltage-limiting amplifier 332 can respond to the control signal Icontrol and issue a load current regulation signal to drive the switch controller 323 to regulate the output voltage of the power converter stage 310, and thereby regulating the charging current for the battery pack 304. Furthermore, the fractional first reference voltage $V_{ID}$ shown in FIG. 4 can be transmitted to the battery management controller 308 through an input/output interface between the power adapter 300 and the portable computer 302. Therefore, the battery management controller 308 can be aware of the output power of the power adapter 300, as shown in FIG. 3.

Besides, the power adapter 300 can optionally include a current-limiting circuit 329 having the current-sensing resistor Rs31 and a transconductance amplifier 334. The current-sensing resistor Rs31 is located on the current return path of the power converter stage 310 and is configured to generate a sensed voltage being proportional to the output current when the output current of the power converter stage 310 flows through the current-sensing resistor Rs31. The sensed voltage is coupled to the inverting input terminal of the transconductance amplifier 334, and the non-inverting input terminal of the transconductance amplifier 334 is configured to receive a third reference voltage Vref33. The third reference voltage Vref33 is generated by a voltage divider (R37, R38) being connected to the first reference voltage Vref31 and is proportional to a maximum current. The transconductance amplifier 334 compares the sensed voltage with the third reference voltage Vref33 to determine if the output current of the power converter stage 301 reaches the maximum current. If it is determined that the output current of the power converter stage 310 reaches the maximum current, the transconductance amplifier 334 issues an over-current detection signal. The over-current detection signal is sent to the switch controller 323 through the photo coupler 328, so that the switch controller 323 can limit the output current of the power converter stage 310 at the maximum current to prevent the over-current problems.

Figure 1:
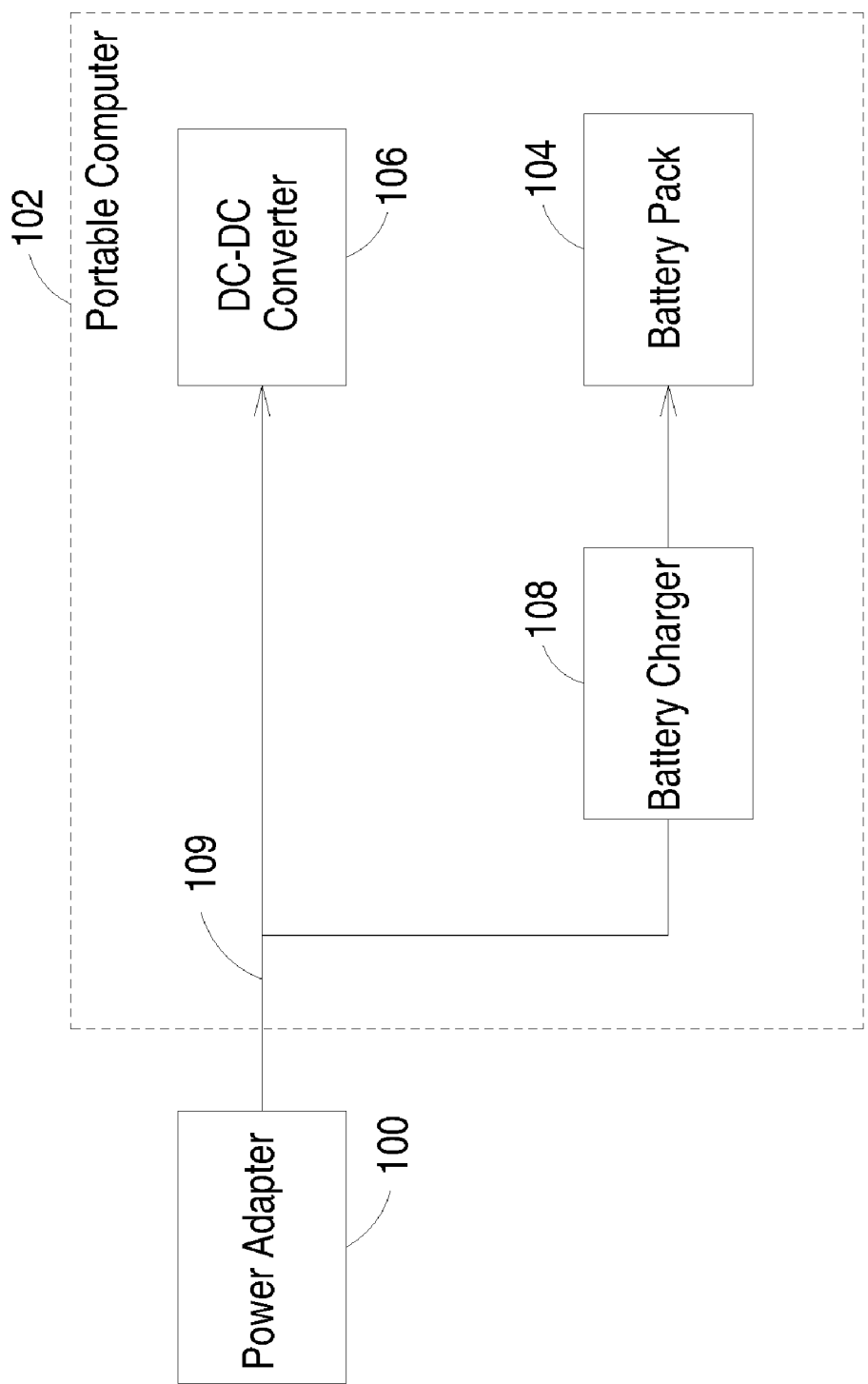
FIG. 1 is a diagrammatic view showing the power supply system for a portable computer according to the prior art.
Figure 2:
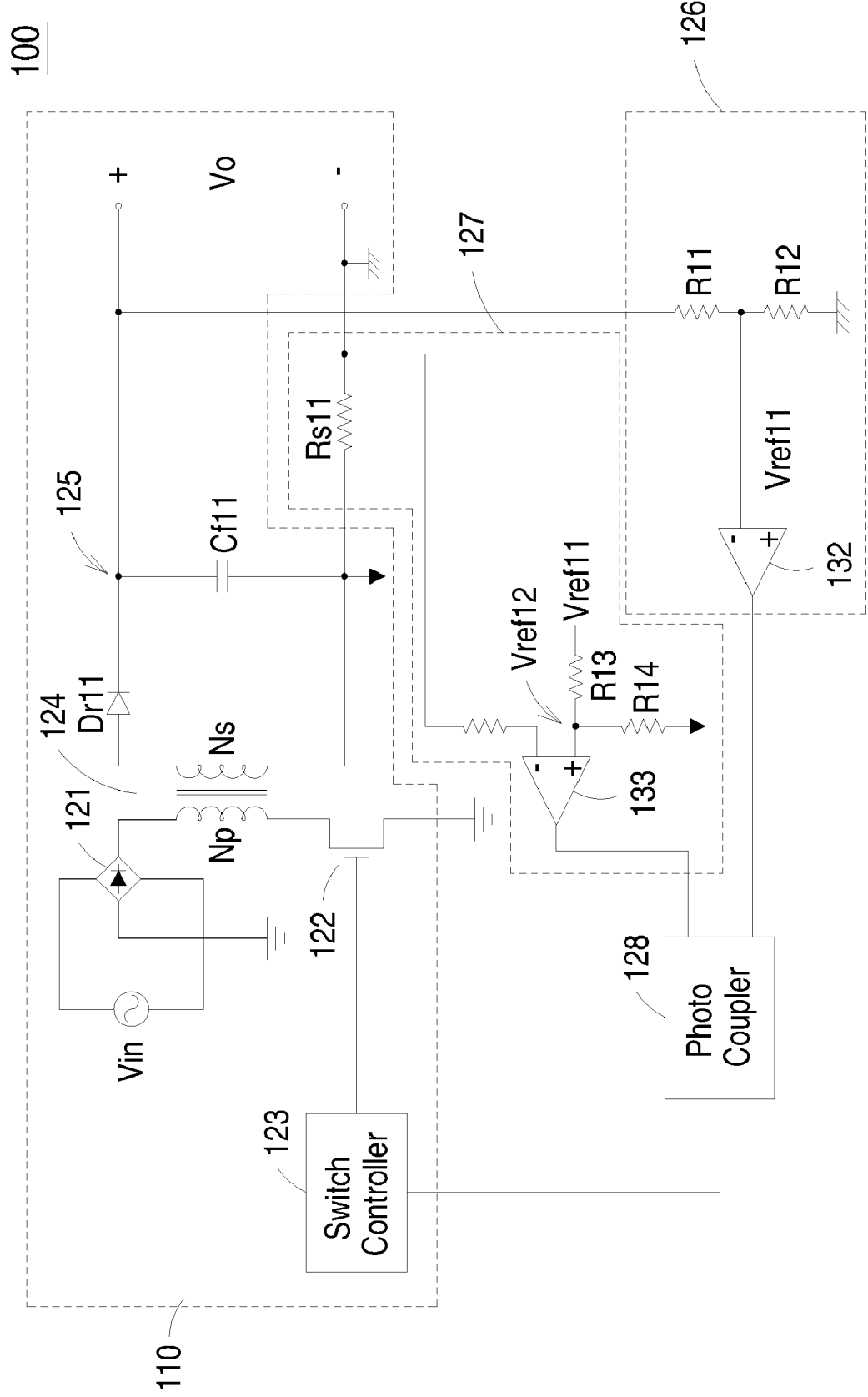
FIG. 2 is a circuit block diagram of the power adapter of FIG. 1.

In conclusion, the present invention proposes a power adapter being configured to limit the output power of the power adapter at a predetermined level when the output current of the power adapter reaches a threshold current. Also, the inventive power adapter can receive a current control signal from the battery management controller located in the load side (the battery pack) to drive the switch controller of the power adapter so as to accomplish the output voltage regulation, thereby regulating the load current provided to the load (the charging current provided to the battery pack). Compared the power adapter with the conventional power adapter of FIG. 1, it can be understood that the power-limiting circuit carried out by the present invention can effectively manage the output power of the power adapter to prevent the over-power problems caused by over-current conditions. Also, the output voltage of the power adapter can be regulated according to the control of the load so as to regulate the load current provided to the load side. Obviously, the inventive power adapter can flexibly adjust the output voltage and load current according to the load's requirements, so that the power loss produced in the load side can be greatly reduced and the conversion efficiency of the DC-DC converter located in the load side can be enhanced. More advantageously, the circuit complexity and the manufacturing cost of the internal components of the load can be dramatically reduced.

Those of skilled in the art will recognize that these and other modifications can be made within the spirit and scope of the present invention as further defined in the appended claims.

What is claimed is:
1. A power adapter comprising:
   a power converter stage having a switch controller for converting an input power into an output power for powering a load;

a voltage-limiting circuit connected to an output terminal of the power converter stage for comparing an output voltage of the power converter stage with a first reference voltage and limiting the output voltage of the power converter stage at a predetermined level through the switch controller when an output current of the power converter stage is smaller than a threshold current; and a power-limiting circuit connected to an output terminal of the power converter stage for limiting an output power of the power converter stage at a predetermined level through the switch controller when the output current of the power converter stage reaches the threshold current;

wherein the voltage-limiting circuit transmits the first reference voltage to the load so that the load is aware of the output power of the power adapter.

2. The power adapter according to claim 1 wherein the voltage-limiting circuit is connected to a voltage output terminal of the power converter stage.

3. The power adapter according to claim 1 wherein the voltage-limiting circuit comprises a voltage-limiting amplifier being configured to compare the output voltage of the power converter stage with the first reference voltage and in response thereto issue an error control signal to the switch controller, thereby limiting the output voltage of the power converter stage at a predetermined level through the switch controller.

4. The power adapter according to claim 3 wherein the voltage-limiting circuit is configured to receive a current control signal from the load and in response to the current control signal issue a load current regulation signal to the switch controller so as to regulate the output voltage of the power converter stage through the switch controller.

5. The power adapter according to claim 1 wherein the power-limiting circuit comprises a current-sensing device for detecting the output current of the power converter stage and a power-limiting amplifier for comparing a voltage indicative of an output current sensed by the current-sensing device with a second reference voltage indicative of the threshold current, and issuing a power-limiting signal to the switch controller when the output current of the power converter stage reaches the threshold current, so as to limit the output power of the power converter stage at a predetermined level through the switch controller.

6. The power adapter according to claim 5 wherein the current-sensing device comprises a resistor.

7. The power adapter according to claim 5 further comprising a current-limiting circuit having a transconductance amplifier for comparing a voltage indicative of an output current sensed by the current-sensing device with a voltage indicative of a maximum current, and issuing an over-current detection signal to the switch controller when the output current of the power converter stage reaches the maximum current, so as to limit the output current of the power converter stage at the maximum current through the switch controller.

8. A power adapter comprising:
a power converter stage having a switch controller for converting an input power into an output power for powering a load;
a voltage-limiting circuit connected to an output terminal of the power converter stage for comparing an output voltage of the power converter stage with a first reference voltage and limiting the output voltage of the power converter stage at a predetermined level through the switch controller when an output current of the power converter stage is smaller than a threshold current; and
a power-limiting circuit connected to an output terminal of the power converter stage for limiting an output power of the power converter stage at a predetermined level through the switch controller when the output current of the power converter stage reaches the threshold current;
wherein the voltage-limiting circuit is configured to receive a current control signal from the load and in response to the current control signal issue a load current regulation signal to the switch controller, so as to regulate the output voltage of the power converter stage through the switch controller, and wherein the voltage-limiting circuit transmits the first reference voltage to the load so that the load is aware of the output power of the power adapter.

9. The power adapter according to claim 8 wherein the voltage-limiting circuit is connected to a voltage output terminal of the power converter stage.

10. The power adapter according to claim 8 wherein the voltage-limiting circuit comprises a voltage-limiting amplifier being configured to compare the output voltage of the power converter stage with the first reference voltage and in response thereto issue an error control signal to the switch controller, thereby limiting the output voltage of the power converter stage at a predetermined level through the switch controller.

11. The power adapter according to claim 8 wherein the power-limiting circuit comprises a current-sensing device for detecting the output current of the power converter stage and a power-limiting amplifier for comparing a voltage indicative of an output current sensed by the current-sensing device with a second reference voltage indicative of the threshold current, and issuing a power-limiting signal to the switch controller when the output current of the power converter stage reaches the threshold current, so as to limit the output power of the power converter stage at a predetermined level through the switch controller.

12. The power adapter according to claim 11 wherein the current-sensing device comprises a resistor.

13. The power adapter according to claim 11 further comprising a current-limiting circuit having a transconductance amplifier for comparing a voltage indicative of an output current sensed by the current-sensing device with a voltage indicative of a maximum current, and issuing an over-current detection signal to the switch controller when the output current of the power converter stage reaches the maximum current, so as to limit the output current of the power converter stage at the maximum current through the switch controller.

14. A power adapter comprising:
a power converter stage having a switch controller for converting an input power into an output power for powering a load;
a voltage-limiting circuit connected to an output terminal of the power converter stage for comparing an output voltage of the power converter stage with a first reference voltage and limiting the output voltage of the power converter stage at a predetermined level when an output current of the power converter stage is smaller than a threshold current;
a power-limiting circuit connected to an output terminal of the power converter stage for limiting an output power of the power converter stage at a predetermined level when an output current of the power converter stage reaches the threshold current; and
a current-limiting circuit connected to an output terminal of the power converter stage for limiting the output current of the power converter stage at a maximum current when the output current of the power converter stage reaches the maximum current;

wherein the voltage-limiting circuit is configured to receive a current control signal from the load and in response to the current control signal issue a load current regulation signal to the switch controller so as to regulate the output voltage of the power converter stage, and wherein the voltage-limiting circuit transmits the first reference voltage to the load so that the load is aware of the output power of the power adapter.

15. The power adapter according to claim 14 wherein the voltage-limiting circuit is connected to a voltage output terminal of the power converter stage.

16. The power adapter according to claim 14 wherein the voltage-limiting circuit comprises a voltage-limiting amplifier for comparing the output voltage of the power converter stage with the first reference voltage and in response thereto issuing an error control signal to the switch controller, and thereby limiting the output voltage of the power converter stage at a predetermined level through the switch controller.

17. The power adapter according to claim 14 wherein the power-limiting circuit comprises a current-sensing device for detecting the output current of the power converter stage and a power-limiting amplifier for comparing a voltage indicative of the output current sensed by the current-sensing device with a second reference voltage indicative of the threshold current, and issuing a power-limiting signal to the switch controller when the output current of the power converter stage reaches the threshold current, thereby limiting the output power of the power converter stage at a predetermined level through the switch controller.

18. The power adapter according to claim 17 wherein the current-sensing device comprises a resistor.

19. The power adapter according to claim 17 wherein the current-limiting circuit comprises a transconductance amplifier for comparing a voltage indicative of the output current sensed by the current-sensing device with a third reference voltage indicative of a maximum current, and issuing an over-current detection signal to the switch controller when the output current of the power converter stage reaches the maximum current, thereby limiting the output current of the power converter stage at the maximum current.

* * * * *